United States Patent Office  3,537,002
Patented Oct. 27, 1970

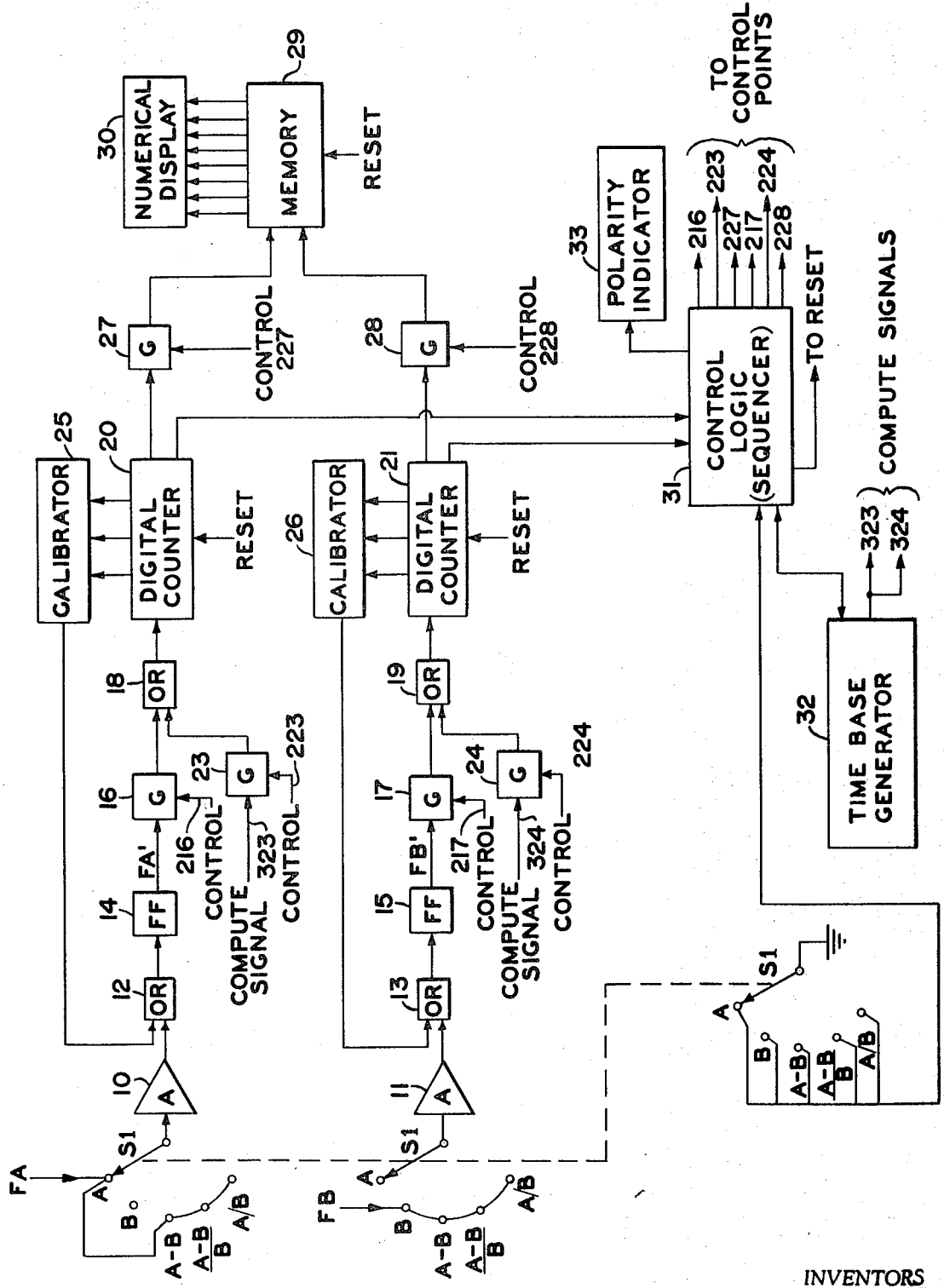

3,537,002
DIGITAL APPARATUS FOR CALIBRATING AND DISPLAYING PLURAL INPUT FREQUENCIES AND FOR COMPUTING THEIR DIFFERENCES AND RATIO
Lambert Haner, Rocky River, and Robert Henry Sayre, Orange Village, Ohio, assignors to Avtron Manufacturing, Inc., Cleveland, Ohio, a corporation of Ohio
Filed Sept. 21, 1967, Ser. No. 669,656
Int. Cl. G01r 23/14; G01p 3/56
U.S. Cl. 324—79                                            3 Claims

ABSTRACT OF THE DISCLOSURE

A digital frequency differencing and other relationship computing and displaying apparatus has a pair of pulse train input channels respectively connected through a mode of operation selector switch to first and second channel first gates. Each first gate feeds through a respective OR to a respective calibrated counter. The OR's are also fed by first and second channel second gates, respectively. Each counter calibrator combination is wired to provide adjustable feedback to the respective first gate, as well as to provide output to respective first and second channel third gates and therethrough to a numerical display device. A compute signal derived from a plural output frequency time base generator feeds the second gates, and the six gates are controlled by control logic apparatus connected responsive to selector switch position and to the outputs of the two counters.

CROSS REFERENCE TO RELATED APPLICATION

In co-pending application Ser. No. 655,171, filed July 21, 1967 in the names of Haner and Sarver, there is disclosed frequency measuring and differencing apparatus employing anti-coincidence and digital subtractor (including reversible counter) circuitry as for comparing process material speed at one point with process material speed at another point in a continuous production line, as in a paper mill.

BACKGROUND OF THE INVENTION

The present invention relates to a digital computing and readout device that operates on input information which might be either a continuous (e.g., sine wave) frequency or a pulse rate. It assumes, as input information, two independent frequencies or pulse rates. Heretofore, the amount of circuitry required, e.g., for anti-coincidence and for reversible counter, as in the co-pending application, or for complex computations as of difference $(A-B)$ or percent difference $$\frac{A-B}{B} \times 100$$

has made prior art equipment unacceptable to some customers from both a first cost and a maintenance standpoint.

SUMMARY OF THE INVENTION

According to one aspect of the invention, depending upon the sequence of operation called for by a control logic unit, a count stored in one (channel) counter or the other is transferred to a memory circuit and as a result displayed on the numerical display. With input information supplied as either one or plural continuous frequencies or pulse rates, each is independently multiplied according to predetermined parameters to relate them to a common proportionality factor. Either result can be displayed, their difference can be computed and displayed, their ratio can be computed and displayed, and percent difference can be computed and displayed.

BRIEF DESCRIPTION OF THE DRAWING

Various objects and advantages will become apparent and the invention may be better understood from consideration of the following description taken in connection with the accompanying drawing.

The single figure of the drawing is a one line and block diagram schematically illustrating digital calibrating, computing and displaying apparatus embodying the invention in preferred form.

DESCRIPTION OF PREFERRED EMBODIMENT

Referring first to FIG. 1, input channels (symbolically shown each by one line) are assumed fed with respective pulse trains of variant frequency, as designated at FA and FB. The two input channels are basically identical in operation, and, although the order of arrangement is somewhat unimportant, each is shown first taken through a respective part of a multi-pole five point selector switch S1, then through an amplifier 10, 11, respectively, for amplifying and conditioning the respective signal, then through an OR gate 12, 13, then through a binary (flip-flop) 14, 15, the respective outputs of the two binaries being designated as FA' and FB'. Next, the signals are taken each through a respective first signal gate 16, 17, then through an OR gate 18, 19, and then into a digital counter 20, 21, respectively, as shown. For each line, a second signal gate 23, 24 also feeds the respective OR gate 18, 19.

In operation, the outputs from either digital counter, representing the different possible states that the counter can possess, are inserted into a calibrator, as indicated in the drawing at 25, 26. The output of each calibrator is a pulse rate which is returned to the OR gate (12 or 13) which follows the respective input amplifier. In customary manner, the output of the calibrator is dependent upon which of the digital signal lines, that are derived from the digital counter, are connected in the calibrator. This allows an input frequency, such as that designated FA', to be varied by an amount ranging from $\frac{1}{2}$ of FA to $1 \times FA$. The resolution to which this can be done depends upon the capacity of the digital counter (20, 21) for which we have preferred two flip-flops plus three decades plus two more flip-flops amounting, in effect, to $\frac{1}{2}$, $\frac{1}{4}$, $\frac{1}{40}$, $\frac{1}{400}$ and so on to $\frac{1}{16,000}$, in practice giving $\frac{1}{4}$ f.p.m. resolution up to 4000 ft. a minute where input frequency such as FA is derived from a pulse generator output indicative of a process material speed. But for ease in understanding the operation as it is described hereinafter, it will be assumed that, instead of four binaries and three decades, each counter has no binaries but has four decades (going to 9999, and then to 0).

As an example of counter operation, assume that FA is 1500 cycles per second and that the calibrator 25 is set such that the frequency FA' is 1000 c.p.s. If the digital counter 20 is reset to zero, and the control line 216 (to gate 16) causes the gate to open for one second and then close, the number stored in the digital counter 20 will be 1000 counts.

The output of counter 20 is fed through a gate 27 into a memory device 29 assumed acting as an "OR" and having an associate numerical display 30. The operation of the FB channel is identical whenever switch S1 calls for it. Depending upon the sequence of operations from a control logic unit 31, the count that is stored in either counter can be transferred to the memory unit 29 and, as a result, displayed on the numerical display 30.

Various arrangements of relaying or switching (such as the switch S1 shown) can thus be used to enable readout (e.g., as calibrated) of either FA or FB.

In order to measure the difference between FA and FB, S1 is switched and both "measurements" are respectively performed in counters 20, 21 at the same time. As an example, let it be assumed that thereupon the number stored in counter 20 is 850 and the number stored in counter 21 is 950. Regardless of sign (polarity) the arithmetical difference between these two counts is 100. In order to compute and display this difference the following are the relevant happenings. Since the measurement of input frequencies has been made, the control logic (sequencer) 31 has arranged that the gates 16 and 17 are disabled (closed) and the control logic opens gates 23 and 24 to allow a compute signal (323, 324) to be fed into both counters 20 and 21. In the illustrated arrangement, the compute signal is derived from a time base generator 32 which might conveniently provide various frequencies (e.g., 100 kc., 10 kc., and a fraction such as $10/_{16,000}$ kc.) to be used singly or together or not at all, for the various modes of operation. But for the condition presently assumed (differencing), the compute signal which enters gates 23 and 24 is identical so that all the time these gates (23, 24) are open, the number of pulses entering counter 20 and counter 21 are identical. The control logic unit senses which counter will reach, say, the count of 10,000 first. It uses this information to determine which gate 27 or 28 will then open in order to transfer something to the memory, and also uses the information to provide an indication on a polarity indicator 33 which can be simply a panel having two indicating lamps, one marked "+" and the other "—." When the counter having the lower numerical count reaches 10,000 the control logic closes the gates 27, 28. In the assumed case "B" counter 21 (950 count) reaches 10,000 first, both continue to count until "A" counter 20 reaches 10,000, at which time counter 21 has counted 10,100 counts, but because of the assumed design the count of 10,000 is identical to the count of 0 so that the count stored in 21 is equivalent to 100. The control logic 31 enables the numerically higher channel gate 28 so as to transfer this "100" into the memory circuit and the number 100 appears on the numerical display.

For measuring ratio, $A/B \times 100$ is often preferred, or the decimal can be considered at any convenient place, so that quantities both greater and less than one can be easily read. The operation is then fairly straightforward; the control lines to the first gates 16, 17 and the third gates 27, 28 are not established as a function of time but are established by the digital counters themselves (through the control logic). For example, the geographically lower counter 21 may be used to control the opening of the geographically upper channel first gate 16 at some convenient lower counter number (such as a 00 following a 99) and then the ratio is read by switching the geographically upper count through gate 27 to display at 30 something like 90 ($\times .01$, the ratio relation of 850 to 950).

For measuring percent difference $$\frac{A-B}{B}; = A/B - B/B$$

again possibly times 100, the operation can be: first, the same as for determining ratio (e.g., gating geographically upper channel with lower); and, second, the final steps for differencing (e.g., feed in compute signal to both channels until the numerically lower reaches zero, and then read out the other).

Standard, well-known parts may be used throughout. Each gate could be a flip-flop; the OR's might be merely wire junctions, or NOR's might be substituted for the OR's shown so as to take advantage of currently available integrated circuits; the calibrators may each consist of R-C differentiating networks set by conventional slide or rotary switches; the Control Logic can consist primarily of a network of NAND gates with perhaps two of them forming a flip-flop for polarity sensing; the memory can include any appropriate flip-flops, or relaying; and the numerical display can consist of a bank of nixie tubes each capable of displaying 0 through 9.

There is thus provided apparatus of the class described capable of meeting the objects of the invention and having advantages of (1) ease of calibration both at time of original installation and whenever extraneous factors (such as roll wear) need be considered; (2) versatility of calibration (since either frequency can be separately calibrated in order to relate them to some predetermined proportionality factor); (3) digital readout; (4) elimination of much prior art apparatus previously needed (such as the anti-coincidence and reversible counter circuitry of the above mentioned co-pending application), and (5) ready access to differing modes of operation (FA; FB; FA—FB; FA/FB; percentage difference).

While we have illustrated and described a particular embodiment, various modifications may obviously be made without departing from the true spirit and scope of the invention which we intend to have defined only by the appended claims taken with all reasonable equivalents.

We claim:

1. Digital apparatus responsive to first and second conditions in a process as represented by two pulse frequencies, FA and FB, said apparatus comprising, a first means for counting and providing plural output connections which are respectively operative at different states of count which the means for counting may possess, a first adjustable calibrator means supplied by said counter output connections for providing a manually adjustable feedback frequency proportional to the input frequency to said means for counting, a second means for counting which is like the first, a second adjustable calibrator means which is like the first except that said second calibrator means is supplied by the output connections which are respectively operative at different states of count which the second counting means may possess, first gating means (12) for combining the first calibrator feedback frequency with frequency FA, second gating means (13) for combining the second calibrator feedback frequency with frequency FB, a selector switch, a control logic device connected to be sequenced by said selector switch, a first circuit means (216, 16) controlled by the control logic device for gating the output of said first gating means to the first means for counting, a second circuit means (217, 17) controlled by the control logic device for gating the output of said second gating means to the second means for counting, a time base generator having at least one constant frequency output, a third circuit means (223, 323, 23) controlled by the control logic device for selectively applying the constant frequency output of the time base generator to the first means for counting at a time determined by the control logic, a fourth circuit means (224, 324, 24) controlled by the control logic device for selectively applying the constant frequency output of the time base generator to the second means for counting at a time determined by the control logic, a readout device, said first and second counting means having additional outputs which are connected to the control logic device, and means (27, 28) for connecting additional outputs from said first and second counting means to the readout device in accordance with control instruction (227, 228) from the control logic device.

means (27, 28) for connecting said additional outputs to the readout device in accordance with control instruction (227, 228) from the control logic device.

2. In digital apparatus for calibrating, reading and comparing first and second frequencies,
   a first source of pulses at the first frequency,
   a second source of pulses at the second frequency,
   a time base generator having at least one constant frequency output,
   a control logic device,
   a pair of input channels each comprising
     a respective one of said sources,
     a first OR gate fed by the respective source,
     a first gate fed responsive to output of the first OR gate and having controlling means for gating in response to said control logic device,
     a second gate fed responsive to the time base generator output and having controlling means for gating in response to said control logic device,
     a second OR gate which receives as inputs the outputs of said first and second gates,
     a digital counter connected to be activated by said second OR gate,
     a presettable calibrator connected to the counter and providing an adjustable calibrator output of pulses for feedback the frequency of said pulses for feedback being proportional to the frequency of the input applied to the counter,
     connection means for feedback of said calibrator output to the first OR gate,
     a third gate which third gate receives, as input, output from the counter and which third gate has controlling means for gating in response to said control logic device,
   means including a manually operable selector switch connected to the control logic device and connections from counter outputs to the control logic device, said means being for determining control logic device output, and
   a readout display means connected to operate responsive to output from the third gates of the said input channels.

3. Method of selectively expressing a frequency A, a frequency B, their difference (e.g., $A-B$), the ratio $(A/B)$, and the percent ratio $$\frac{A-B}{B}$$

which method comprises the steps of
   (1) gating either frequency as input to a respective one of two substantially independent counters for a fixed predetermined period of time, and then gating the respective counter to supply a readout indicative of the respective frequency,
   (2) gating both frequencies simultaneously each as input to a respective counter and each for the same predetermined period of time, then supplying a constant frequency mutually to both counters until the numerically lower count reaches zero, then reading out the count on the other counter to provide a readout indicative of algebraic difference of the frequencies,
   (3) gating both frequencies simultaneously each to a respective counter until a predetermined one of the counters counts one beyond its upper limit of count and reaches a zero count and then reading out the count on the other of the counters whereby to express the ratio between frequencies whether said ratio is greater or less than unity, and
   (4) gating both frequencies simultaneously each as input to a respective counter, and then gating a predetermined one of them with the other to stop the count, and then supplying a constant frequency mutually to both counters until the numerically lower count reaches zero and then reading out the count of the counter having the higher number, whereby to provide a readout of percent difference of the frequencies.

References Cited

UNITED STATES PATENTS

| 2,880,612 | 4/1959 | Covne et al. | 324—79 X |
| 2,951,202 | 8/1960 | Gordon | 324—79 |
| 3,221,250 | 11/1965 | An Wang | 324—79 X |
| 3,227,959 | 1/1966 | Proebster et al. | 324—79 |

OTHER REFERENCES

5214L Preset Counter, Hewlett—Packard Technical Data Publication, June 12, 1963.

RUDOLPH V. ROLINEC, Primary Examiner

M. J. LYNCH, Assistant Examiner

U.S. Cl. X.R.

324—69